Figure 1:
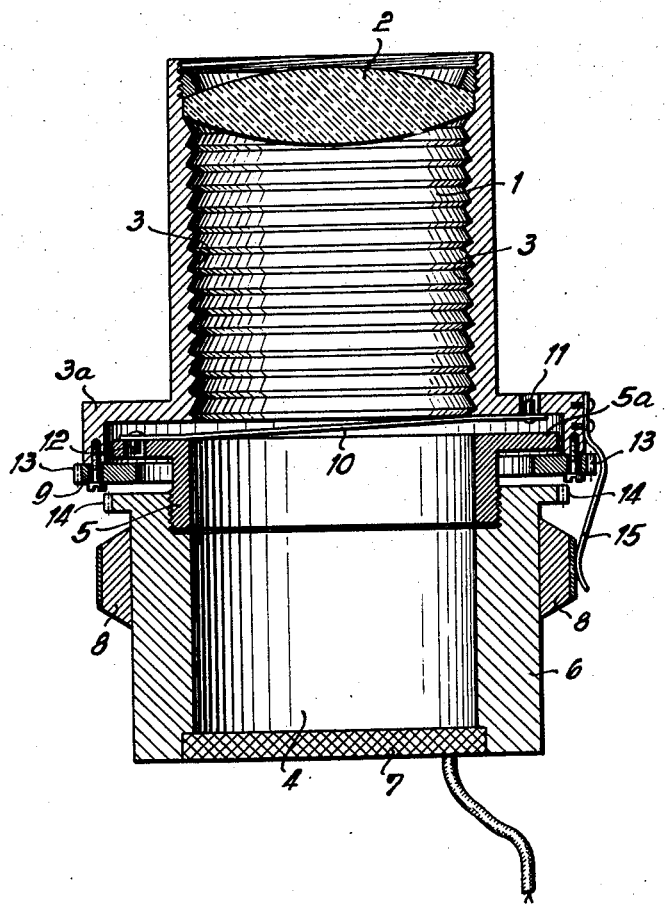

Oct. 18, 1960     F. FAULHABER     2,957,085
DEVICE FOR BUNDLING LIGHT FOR LIGHT MEASURING DEVICES
Filed Nov. 30, 1956     2 Sheets-Sheet 1

INVENTOR
FRITZ FAULHABER

BY
Mock&Blum
ATTORNEYS

Oct. 18, 1960 F. FAULHABER 2,957,085
DEVICE FOR BUNDLING LIGHT FOR LIGHT MEASURING DEVICES
Filed Nov. 30, 1956 2 Sheets-Sheet 2

INVENTOR
FRITZ FAULHABER

BY Mocks Blum
ATTORNEYS

United States Patent Office 2,957,085
Patented Oct. 18, 1960

2,957,085

DEVICE FOR BUNDLING LIGHT FOR LIGHT MEASURING DEVICES

Fritz Faulhaber, Schonaich, Wurttemberg, Germany, assignor to Voigtlander Aktiengesellschaft, Braunschweig, Germany, a corporation of Germany Filed Nov. 30, 1956, Ser. No. 625,326

Claims priority, application Germany Dec. 3, 1955

11 Claims. (Cl. 250—229)

This invention relates to a device for collecting light rays for the purpose of measuring light and it has particular relation to devices of this type, particularly for measuring light by means of photographic exposure meters, in which an objective lens and a diaphragm are used.

An exposure meter provided with optics for forming an image of the object, and having a diaphragm which is located in the image plan of the objective and can be modified in size, has been known previously in connection with the measurement of the exposure time of photographic objects. In this known case the photo-cell is arranged closely behind the diaphragm whereby a frosted glass plate is inserted in front of the photo-cell, which reduces the intensity of the light to be measured and thus undesirably reduces the sensitivity of measuring. This known arrangement is used for carrying out a measuring method, in which at least two comparative measurements of the same object have to be performed with diaphragm openings having a known relation of their dimensions.

The object of the present invention is to provide a novel, improved and particularly advantageous device for the collection of light rays, the use of which is not dependent on a specific process and in which structural parts which reduce the intensity of the light to be measured, such as frosted glass plates and the like, are not present.

An essential feature of the present invention consists in assembling the collecting device for the measuring light, i.e. of the collecting optics used and of the variable diaphragm with the measuring organ influenced by the light to a structural unit which is complete in itself and remains stable. Such a structural unit has the considerable advantage in industrial production that it can be mounted and adjusted in great numbers as a unit and can then be inserted in optical or photographic devices of the most varied types, for example in photometric measuring instruments, in hand exposure meters, in cameras provided with built-in exposure meters, or as a control organ for automatic exposure adjustments and the like. In all these cases the device according to the present invention can be handled as a structural element which is complete by itself, does not require any subsequent adjustment and substantially reduces the manufacturing expenses of the instruments here in question.

According to a preferred embodiment, the device of the invention, in its basic form, consists of a simple tube-shaped casing which carries at its front end the optical element, for example a round collective lens, at its rear end the measuring organ influenced by light, said organ having preferably likewise a round form corresponding to the collective lens, and in the middle a variable aperture diaphragm. It is contemplated according to the present invention that not only the distance between lens and diaphragm—in the plane of which the lens is supposed to form the image—but also the distance between the diaphragm and the measuring organ influenced by light—over the entire photo-electrically active surface of which the incident measuring light is supposed to be distributed as uniformly as possible—be about equal to the focal length of the lens. Thus, the collecting device is a tube shaped body, the diameter of which approximately corresponds to the diameter of the lens and that of the measuring organ influenced by the light and the length of which is about double the focal length of the lens.

In carrying out the present invention, all conventional diaphragm types can be used, including rotary diaphragms, sliding diaphragms, cat's-eye diaphragms and the like, but the use of iris diaphragms has been found to be of particular advantage. The reason is not only that iris diaphragms can be adjusted continuously. It is a further advantage that they fit well—without undesired enlargements—into the tubular structural design and offer favorable possibilities for the adjusting mechanism, as will be described in more detail further below.

As the organ which is influenced by the light, likewise all conventional types of suitable structure can be used. However, in view of the requirement for obtaining objective measurement of the light, it is preferred to use a photo-electrically operating aggregate. A photo-electric element which produces current by itself is undoubtedly capable to meet even high requirements in connection with exposure measurements, whereby however it should be taken into consideration that in the case of measurements at less bright illumination of the object space, or at a small measuring angle, a reliable electrical amplifying arrangement should be provided. The use of an electric amplifier, which represents an additional structural member, is, however, unnecessary if the device of the present invention is provided with a photo-resistance cell, the use of which has been found to be of particular advantage in the present invention.

In order to avoid interference by light which does not originate from the object to be photographed, or from its parts, it is contemplated according to the invention to provide the walls of the chamber between the objective and the iris diaphragm with dull black steps of the type conventionally used in other cases in the construction of photographic cameras. In contrast to this, for the chamber between the diaphragm and the photo-cell bright walls, and in particular cases mirror walls, are suggested according to the invention. This last mentioned step meets the requirement of guiding all light incident through the diaphragm opening, to the active layer of the photo-cell—in following the principle of an integrating spherical photometer, such as the "Ulbricht Sphere"—in order to secure correct measuring of the light.

Adjustment of the diaphragm can be carried out with particular advantage by means of the light collector casing, for example by turning its two chambers relative to each other. In order to attain this, one of the chambers, for example the chamber between the lens and the diaphragm, is fixedly connected with one diaphragm adjusting member, for example the diaphragm ring, while the other chamber, for example the chamber between diaphragm and photo-cell, is fixedly connected with the other diaphragm adjusting member, for example the diaphragm frame. If the two chambers are turned in one or the other direction relative to each other, the diaphragm opening will be either increased or decreased.

The device of the present invention, which is characterized by a stable uniform structure, is extremely suitable as an essential structural part for the automatic exposure adjusting system of photographic cameras and particularly for such automatic systems which are controlled by an electric exposure meter. This device results, for example, in a known automatic exposure system which operates with a bridge connection to be balanced to zero and operates a reversible motor in connection with the adjustment of the exposure factors—in an extremely simple, reliable and clear construction. Thereby, for example the diaphragm of the picture-taking objective may be adjustable with the front chamber of the bundling device, while the rear chamber rotates with the time adjusting ring of the camera objective. As a further simplification, it is contemplated according to the present invention that the outer wall of at least one chamber of the bundling device be made entirely or partially of electrically insulating material, such as for example glass. On the latter, the resistance line of a bridge potentiometer is arranged, while the associated potentiometer slider is held by the second chamber. In this manner, the rotating movements on the potentiometer, which act on the bridge connection, are coupled with the light collector diaphragm and, if desired, also with the adjusting members for the picture-taking objective diaphragm and the exposure time, respectively, or are at least capable of being coupled easily. It has been found to be of advantage to fasten the photocell too to the chamber part consisting of non-conducting material. In this manner only one electrical connection member of the photo-cell has to project from the structural unit which is complete by itself and comprises the bundling device and the measuring organ influenced by light.

The appended drawings diagrammatically illustrate by way of example and without limitation an embodiment of the invention which represents a best mode for carrying out the invention and to which the invention is not limited.

Figure 2:
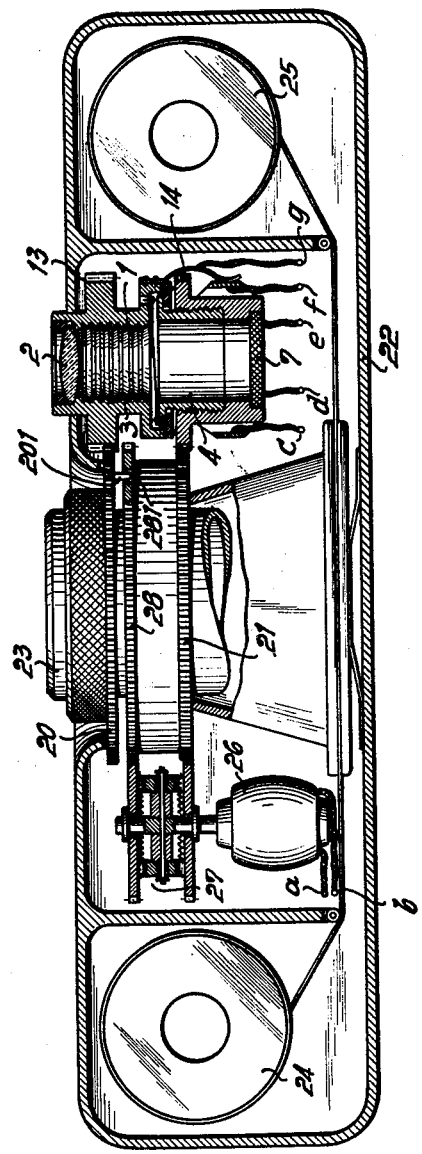

In the drawings:

Fig. 1 is a somewhat diagrammatic axial sectional view of a light ray collector embodying the invention; and Fig. 2 is a sectional view of a photographic camera having the light ray collector of Fig. 1 built-in therein.

Referring now to the drawings in detail, the light ray collector casing illustrated in Fig. 1 consists of two chambers of about equal dimensions, which are separated by the iris diaphragm. The outer end of tubular front chamber 1 is closed by a collective objective, for example the collective lens 2. The inner surface of the chamber 1 has a stepped or graded design and a black dull surface. The rear chamber 4 consists of a metallic tubular body 5, to which a second tubular member 6 consisting of electrically non-conducting material is secured. The outer end of member 6 has mounted therein the photo-cell 7 which is preferably a photo-resistance cell, and the resistance of an annular potentiometer 8 extends around its outer surface. The inner surface of chamber 4 is bright, for example of white color, or mirrorlike. The length of each of the two chambers 1 and 4 approximately corresponds to the focal length of lens 2. Member 3 is formed with a circumferentially and axially extending flange 3a embracing a radial flange 5a on the adjacent end of member 5. Members 3 and 5 are held against relative axial displacement by a flat annular ring 9 secured by screws to flange 3a and overlapping the flange 5a of member 5. For the sake of clearness, only one lamella or blade 10 of the iris diaphragm, arranged between the two chambers, is shown in the drawing. Blade or lamella 10 has a pin 11 at one end engaged in a radial flange of chamber 1, and a pin 12 at the opposite end engaged in an operature in flange 5a of member 5. All of the blades or lamellae of the iris diaphragm are mounted in the same manner as the illustrated blade 10. Consequently, if the two chambers 1 and 4 are relatively rotated, the size of the aperture of the iris diaphragm will be correspondingly varied.

The structure shown in the drawing by way of example can be also used as a uniform structural part, for example for an automatic exposure adjustment system for photographic apparatus—which is controlled by an electric exposure meter—and particularly for automatic adjusting systems, in which a reversing motor—which brings about adjustment of the exposure factors, such as exposure time and diaphragm—is controlled by an electric bridge connection which has to be balanced to zero. For this purpose, chamber 1 is provided with a ring gear 13 formed on ring 9 and which, for example, meshes with a pinion 20 (shown in Fig. 2) of the objective diaphragm, while a ring gear 14—which is secured to or integral with chamber 4—is in engagement with spur or ring gear 21 for the time-adjusting mechanism of the picture-taking objective. In addition, the embodiment shown in the drawing comprises, in the structural unit of the light ray collector, a potentiometer which balances to zero an electric bridge connection, this potentiometer including the resistance 8 on the annular body 6 of chamber 4 and the slider 15 on casing 3 (3a) of chamber 1. Thus, by automatically effected balancing to zero of the measuring bridge, the chambers 1 and 4 will be turned in dependence on the adjusting values for time and diaphragm on the picture-taking objective, relative to each other, whereby the light admitting opening of the iris diaphragm of the light ray collector shown is also correspondingly changed.

In Fig. 2 reference numeral 22 denotes the camera casing, 23 the objective and 24 and 25 the film spools. The reversing is indicated at 26. In order to take into consideration the varying sensitiveness of films, an intermediate ring or spur gear 28 is provided, relative to which the diaphragm adjusting pinion 20 can be preadjusted by hand over coupling 201, 281. The electric connections leading into the interior of the camera body are indicated at a–g. The wiring is not described here in detail, because it does not form part of the invention and has no substantial bearing on it.

It will be understood from the above that this invention is not limited to the elements, designs, connections, steps and other details specifically described above and illustrated in the drawings and can be carried out with various modifications without deparing from the scope of the invention as defined in the appended claims.

What is claimed is:

1. A device, for collecting light rays and adjusting the measuring angle of the light beam for photographic exposure meters, comprising a tubular body closed at one of its ends; an objective, of positive refractive power, arranged at the open end of said tubular body; a light-sensitive organ housed by said tubular body near its closed end; a variable diaphragm arranged in said tubular body in substantially the focal plane of the objective; said tubular body having a strongly reflective inner surface between said diaphragm and said light-sensitive organ; the ratio of the lateral dimensions of the light-sensitive surface of said organ to its distance from the plane of said diaphragm corresponding to the greatest relative aperture ratio of said objective to provide for direct incidence on the entire area of such light-sensitive surface of all light rays passing through said objective and the focal point thereof at the maximum aperture opening, and of all other light rays passing through the diaphragm aperture and reflected from the inner surface of said tubular body, during continuously changeable adjustment of the measuring angle by variation of the aperture of said diaphragm.

2. A device as claim in claim 1, in which the light-sensitive organ consists of a photo-cell and the tubular member has a mirror-like inner surface between the diaphragm and photo-cell.

3. A device as claimed in claim 1, in which the objective, the largest diaphragm opening and the light-sensitive organ have substantially equal diameters and the distance between the objective and the diaphragm is substantially equal to the distance between the diaphragm and the light-sensitive organ.

4. A device as claimed in claim 1, in which the tubular body has a black, dull, stepped interior surface between the objective and the diaphragm.

5. A device as claimed in claim 1, in which the tubular body comprises a first chamber between the objective and diaphragm and a second chamber between the diaphragm and the light-sensitive organ, one of said chambers being fixedly connected with a diaphragm adjusting ring and the other of said chambers being fixedly connected with a diaphragm frame, said chambers being movable relative to each other.

6. A device as claimed in claim 5, in which the diaphragm is adjustable conjointly by that part of the tubular member which carries the objective and that part of the tubular member which carries the light-sensitive organ.

7. A device as claimed in claim 6, in which said chambers of the tubular body are provided with exterior ring gears.

8. A device as claimed in claim 5, in which said first and second chamber are rotatable relative to each other.

9. A device as claimed in claim 5, in which the outer wall of at least one of the chambers consists at least partially of an electrically non-conducting material to which the resistance of a potentiometer is fastened, while the slider of the potentiometer is mounted on the other chamber.

10. A device as claim in claim 9, in which the electrically non-conducting wall carries also the photosensitive organ.

11. A device for adjusting the measuring angle of the light beam for photographic exposure meters, comprising a tubular body closed at one of its ends; an objective of positive refractive power, arranged at the open end of said tubular body; a photo-cell housed by said tubular body near its closed end; a variable diaphragm arranged in said tubular body in about the focal plane of the objective; said tubular body having a strongly reflective inner surface between the diaphragm and photo-cell; the ratio of the lateral dimensions of the light-sensitive surface of said cell to its distance from the plane of said diaphragm corresponding to the greatest relative aperture ratio of said objective to provide for direct incidence on the entire area of said light-sensitive-surface of all light rays passing through said objective and the focal point thereof at the maximum aperture opening, and of all other light rays passing through the diaphragm aperture and reflected from the inner surface of said tubular body, during continuously changeable adjustment of the measuring angle by variation of the aperture of said diaphragm.

References Cited in the file of this patent

UNITED STATES PATENTS

| | | |
|---|---|---|
| 1,546,264 | Story | July 14, 1925 |
| 1,990,361 | Bailey | Feb. 5, 1935 |
| 2,059,032 | Riszdorfer | Oct. 27, 1936 |
| 2,209,156 | Fischer | July 23, 1940 |
| 2,612,091 | Weiss | Sept. 30, 1952 |
| 2,655,848 | Gray | Oct. 20, 1953 |
| 2,700,916 | Muirhead | Feb. 1, 1955 |
| 2,763,853 | Grant | Sept. 18, 1956 |
| 2,879,691 | Faulhaber | Mar. 31, 1959 |

FOREIGN PATENTS

| | | |
|---|---|---|
| 453,334 | Great Britain | Sept. 9, 1936 |